(12) United States Patent
Pinard et al.

(10) Patent No.: US 6,580,700 B1
(45) Date of Patent: *Jun. 17, 2003

(54) DATA RATE ALGORITHMS FOR USE IN WIRELESS LOCAL AREA NETWORKS

(75) Inventors: Patrick Pinard, Santa Clara, CA (US); Dean Kawaguchi, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/222,126

(22) Filed: Dec. 29, 1998

Related U.S. Application Data

(63) Continuation-in-part of application No. 08/747,034, filed on Nov. 8, 1996, now Pat. No. 6,002,918, which is a continuation-in-part of application No. 08/549,051, filed on Oct. 27, 1995, now Pat. No. 5,815,811.

(51) Int. Cl.[7] .................................................. H04Q 7/00

(52) U.S. Cl. ..................... 370/332; 370/252; 370/343; 370/543; 455/432; 455/434; 455/436

(58) Field of Search ................................. 370/330, 331, 370/332, 333, 343, 328, 329, 310, 464, 465, 468, 913, 915; 455/436, 439, 434, 453, 440, 432

(56) References Cited

U.S. PATENT DOCUMENTS

| | | | | |
|---|---|---|---|---|
| 5,448,569 A | * | 9/1995 | Huang et al. | 370/332 |
| 5,465,401 A | | 11/1995 | Thompson | 455/89 |
| 5,483,669 A | * | 1/1996 | Barnett et al. | 455/33.2 |
| 5,483,676 A | * | 1/1996 | Mahany et al. | 455/67.4 |
| 5,519,762 A | | 5/1996 | Bartlett | 379/61 |
| 5,568,513 A | | 10/1996 | Croft et al. | 375/224 |
| 5,584,048 A | | 12/1996 | Wieczorek | 455/38.3 |
| 5,630,207 A | | 5/1997 | Gitlin et al. | 455/54.1 |
| 5,640,414 A | * | 6/1997 | Blakeney, II et al. | 375/200 |
| 5,649,289 A | | 7/1997 | Wang et al. | 455/31.3 |
| 5,793,303 A | | 8/1998 | Koga | 340/825.44 |
| 5,815,811 A | | 9/1998 | Pinard et al. | 455/434 |
| 5,896,561 A | * | 4/1999 | Schrader et al. | 455/67.1 |
| 5,915,214 A | * | 6/1999 | Reece et al. | 455/406 |
| 5,920,821 A | * | 7/1999 | Seazholtz et al. | 455/466 |
| 5,960,335 A | * | 9/1999 | Umemoto et al. | 455/226.2 |
| 5,987,062 A | * | 11/1999 | Engwer et al. | 375/225 |
| 6,005,853 A | * | 12/1999 | Wang et al. | 370/332 |

* cited by examiner

*Primary Examiner*—Dang Ton
*Assistant Examiner*—Tri H. Phan

(57) ABSTRACT

A communications network comprising a wireless local area network includes a plurality of access points connected to a host computer and each other, and a plurality of mobile units with each mobile unit being arranged for association with at least one access point. The mobile units are arranged to periodically scan for and identify the most eligible access point for association at the highest data rate on the basis of a performance criteria at the current data rate.

15 Claims, 6 Drawing Sheets

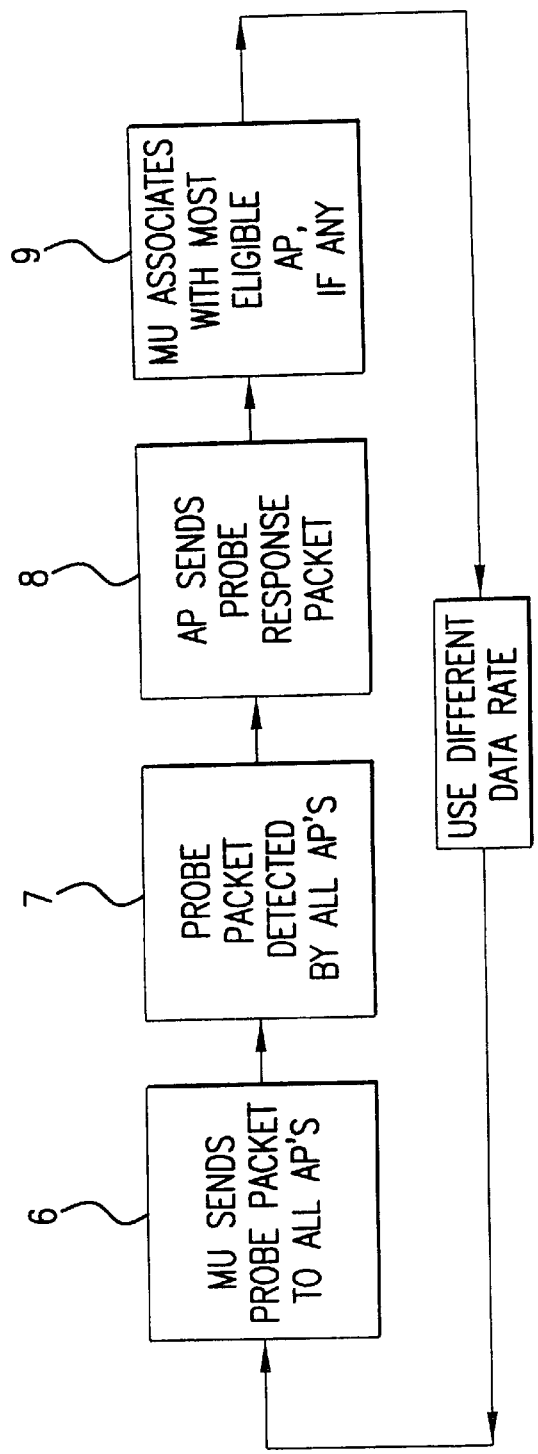

DATA RATE ALGORITHMS FOR USE IN WIRELESS LOCAL AREA NETWORKS

REFERENCE TO RELATED APPLICATIONS

This application is a continuation-in-part of application Ser. No. 08/747,034 filed Nov. 8, 1996, now U.S. Pat. No. 6,002,918, which was a continuation-inpart of application Ser. No. 08/549,051, filed Oct. 27, 1995, now U.S. Pat. No. 5,815,811.

BACKGROUND OF THE INVENTION

1. Field of the Invention

The invention relates generally to wireless local area networks. In particular the invention relates to a local area wireless network with variable data transmission rates, including a plurality of mobile units roaming among access points operating at possibly different data rates.

2. Description of the Related Art

Wireless local area networks (LANs) are used in business applications such as inventory, rice verification mark-down, portable point of sale, order entry, shipping, receiving and package racking. Wireless local area networks use infrared or radio frequency communications channels to communicate between portable or mobile computer units and stationary access points or base stations. These access points are in turn connected by a wired or wireless communication channel to a network infrastructure which connects groups of access points together to form a local area network, including, optionally, one or more host computer systems.

Wireless infrared and radio frequency (RF) protocols are known which support the logical interconnection of portable roaming terminals having a variety of types of communication capabilities to host computers. The logical interconnections are based upon an infrastructure in which at least some each of the remote terminals are capable of communicating with at least two of the access points when located within a predetermined range therefrom, each terminal unit being normally associated with and in communication with a single one of such access points. Based on the overall spatial layout, response time, and loading requirements of the network, different networking schemes and communication protocols have been designed so as to most efficiently regulate the association of the mobile unit with specific access points, and the availability of the communication channel to individual mobile units for broadcasting.

One such protocol is described in U.S. Pat. Nos. 5,029,183; 5,142,550; 5,280,498; and 5,668,803 each assigned to Symbol Technologies, Inc. and incorporated herein by reference.

Another such protocol is described in U.S. Pat. 5,673,031. Still another protocol is set forth in the IEEE Standard 802.11 entitled "Wireless LAN Medium Access Control (MAC) and Physical Layer (PHY) Specifications" available from the IEEE Standards Department, Piscataway, N.J. (hereinafter the "IEEE 802.11 Standard").

The IEEE 802.11 standard permits either infrared or RF communications, at 1 Mbps and 2 Mbps data rates, a medium access technique similar to carrier sense multiple access/collision avoidance (CSMA/CA), a power-save mode particularly important for battery-operated mobile units, seamless roaming in a full cellular network, high throughput operation, diverse antennae systems designed to eliminate "dead spots", and an easy interface to existing network infrastructures.

In Europe, the European Telecommunications Standards Institute (ETSI) has been working in parallel on a protocol standard entitled HIPERLAN (European High Performance LAN), for high data wireless network systems. The frequency spectrum for HIPERLAN in the 5 GHz and 17 GHz bands has been allocated by the European Conference of Postal and Telecommunications Administrations (CEPT), with a proposed data rate of over 20 Mbit/sec. The IEEE 802.11 Committee is also currently considering extensions to the IEEE 802.11 Standard providing for optional higher data rates as well.

The IEEE 802,11 Standard provides for these types of MAC frames-control, data, and management. All control frames are transmitted at one of the PHY mandatory rates, typically 1 Mbps, so that they will be understood by all stations. The other frames are transmitted at one of the rates in the basic rate set under the standard. The algorithm for performing rate switching is beyond the scope of the standard.

The term "roaming" relates to mobile units associating with different access points. Each mobile unit analyzes received signals from access points to identify and associate with an eligible access point. Analogous to cells in a cellular telephone network, the region around a given access point may also be referred to as a "cell". Roaming between cells provides great flexibility and is particularly advantageous in locations that are difficult to wire, for simple relocation of work stations, and for portable work stations.

Although the IEEE 802,11 Standard provides the basic packet types which enable roaming, it does not actually set the roaming algorithm. According to the standard, the mobile unit determines the access point with which it will associate and the access point must accept the mobile unit unless the access point is defective or certain alarm conditions exist, such as memory full. There is, however, no suggestion of how, or by what criteria, other than those mentioned above, the mobile unit might select an appropriate access point, or an optimum access point.

SUMMARY OF THE INVENTION

1. Objects of the Invention

It is an object of the present invention to implement a wireless local area network with multiple data transmission rates.

It is a further object of the present invention to provide an algorithm allowing selection by a mobile unit of an access point for association maximizing the data throughput.

It is still a further object of the present invention to provide a wireless communication system allowing roaming by a mobile unit over access points having different data rate characteristics.

2. Features of the Invention

According to the present invention, there is provided a method in a data communications network including a plurality of stationary access points and a plurality of mobile units, a mobile unit being capable of transmitting at least two data rates and capable of communicating with at least two access points in a predetermined range therefrom, including the steps of evaluating the mobile unit performance; and if the mobile unit performance is below a threshold, scanning for the most eligible access point at predetermined intervals; and associating with the most eligible access point at the highest data rate.

If the mobile unit performance is below a threshold and after, scanning for the most eligible access point at predetermined intervals; and if the mobile unit is unable to associate with another access point at a higher data rate, reduce to data rate to the next lower data rate.

If the mobile unit performance is above a threshold, increasing the data rate of the mobile unit to the next highest data rate.

As a variant of such algorithm, there is provided a method in data communications network including a plurality of stationary access points and a plurality of mobile units, a mobile unit being capable of transmitting at least two data rates, and capable of communicating with at least two access points in a predetermined range therefrom, including the steps to scanning for the most eligible access point at the highest available data rate; evaluating the received access point signal quality and performance at the highest data rate; associating with the most eligible access point at the highest data rate if one is available; scanning for the most eligible access point at a second lower data rate if no association has been made; evaluating the received access point signal quality at the second data rate; and associating with the most eligible access point at the second data rate.

The present invention also provides a data communications network including a plurality of stationary access points and a plurality of mobile units, a mobile unit being capable of transmitting at least two data rates and capable of communicating with at least two access points in a predetermined range therefrom, including means in the mobile unit to scan for the most eligible access point at predetermined intervals means in the mobile unit for evaluating the performance statistics at the current data rate; and means for associating with the most eligible access point at the highest data rate.

The novel features which are considered as characteristic of the invention are set forth in particular in the appended claims. The invention itself, however, both as to its construction and its method of operation, together with additional objects and advantages thereof, will best be understood from the following description of a specific embodiment, when read in conjunction with the accompanying drawings. It is to be understood that the invention may be carried into practice in a number of ways, and the described embodiment is not intended to be limiting.

BRIEF DESCRIPTION OF THE DRAWING

The features believed characteristic of the invention are set forth in the appended claims. The invention itself, however, as well as other features and advantages thereof, may best be understood by reference to the detailed description of a specific embodiment which follows, when read in conjunction with the accompanying drawings, wherein:

FIG. 3 is a block diagram illustrating the steps carried out by a mobile unit during the rate adjusting and roaming process;

FIG. 4 shows a probe response message typically sent by an access point according to the present invention;

DETAILED DESCRIPTION OF A SPECIFIC EMBODIMENT

Figure 1:
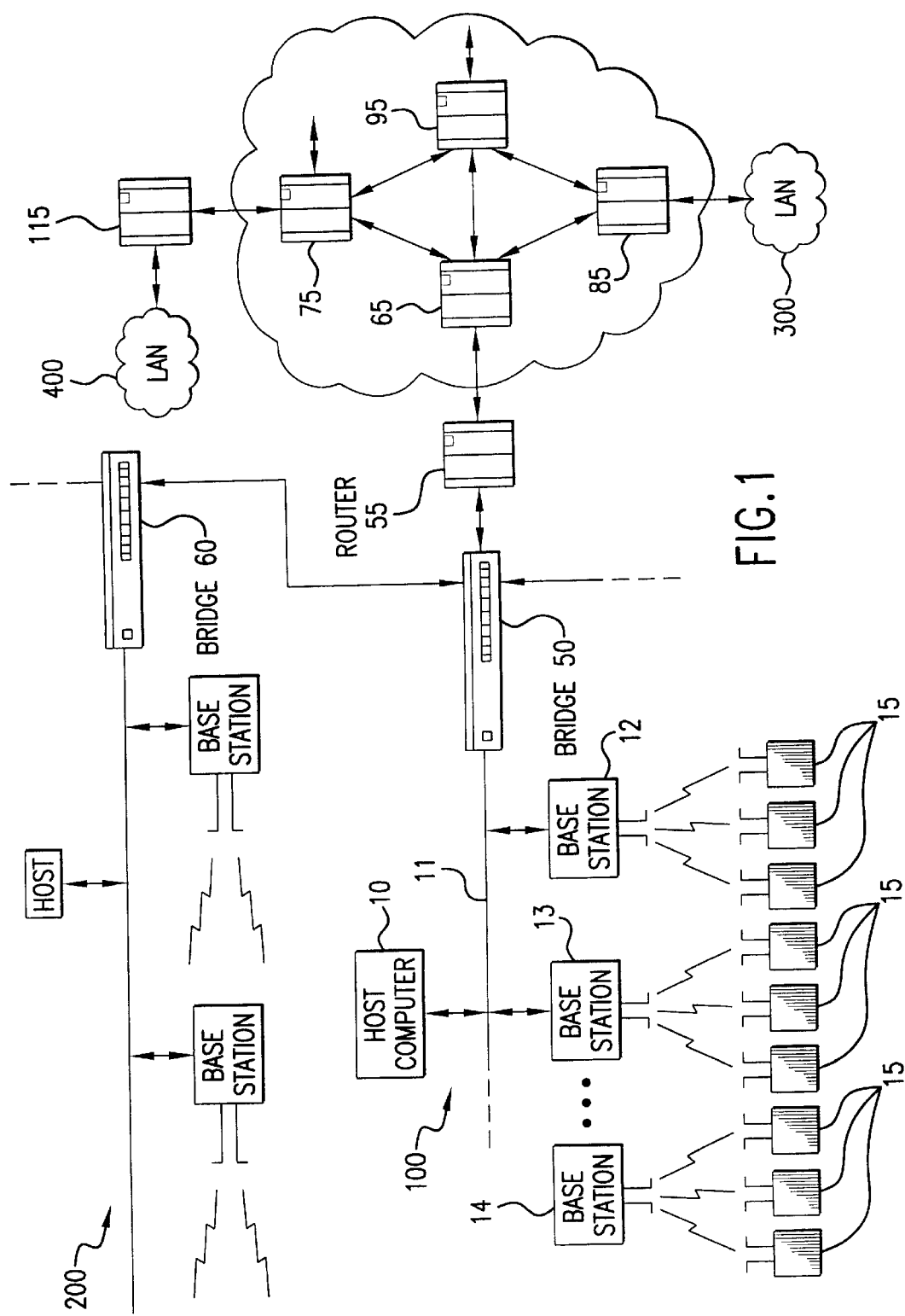
FIG. 1 is a block diagram of a packet data communication system according to one embodiment of the invention.

Referring to FIG. 1, a data communications network according to one embodiment of the invention is illustrated. A first local area network 100 is illustrated, including a host processor 10 is connected by a wired communications link 11 to a number of stationery access points or base stations 12,13; other base stations 14 can be coupled to the host through the base stations or by an RF link. Each one of the base stations 12,13,14 is coupled by an RF link to a number of remote mobile units 15 In one embodiment, the remote mobile units 15 are hand-held, battery-operated data terminals or voice communication handsets such as described in U.S. Pat. Nos. 5,029,183; Ser. Nos. 08/794,782 filed Feb. 3, 1997, and 09/008,710, filed Jan. 16, 1998 all assigned to Symbol Technologies, Inc., and incorporated herein by reference.

Various other types of remote terminals may be advantageously employed in a system having features of the invention; these remote terminals ordinarily would include data entry facilities such as a magnetic card reader or the like, as well as a display (or printer) for indicating to a user information detected, transmitted and/or received by the terminal. In this embodiment used as an illustrative example, there may be from one up to sixty-four of the base stations (three stations being shown in the Figure) and up to several hundred of the remote units; of course, the network may be expanded by merely changing the size of address fields and the like in the digital system, as will appear, but a limiting factor is the RF traffic and attendant delays in waiting for a quiet channel.

The first LAN 100 may be coupled to additional LANs 200,300,400 etc. through controllers such as bridges 50,60, etc. or routers 55,65,75,85,95,105, etc. This communications network as seen in FIG. 1 would ordinarily be used in a manufacturing facility, office building complex, warehouse, retail establishment, or like commercial facility or combination of these facilities, where the data-gathering terminals would be used for inventory control in stockroom or receiving/shipping facilities, at checkout (point of sale) counters, for reading forms or invoices of the like, for personnel security checking at gates or other checkpoints, at time clocks, for manufacturing or process flow control, and many other such uses.

Although hand-held, laser scanning bar-code reader data terminals are mentioned, the data terminals may also include bar-code readers of the CCD or wand type, and may be stationery rather than hand-held. The mobile units 15 may also be voice communication handsets, pagers, still image or video cameras; or any combination of the foregoing. Other types of data gathering devices may be utilized as terminals and use the features of the invention, such as temperature, pressure, or other environmental measuring devices, event counters, voice or sound activated devices, intrusion detectors, etc.

Figure 2:
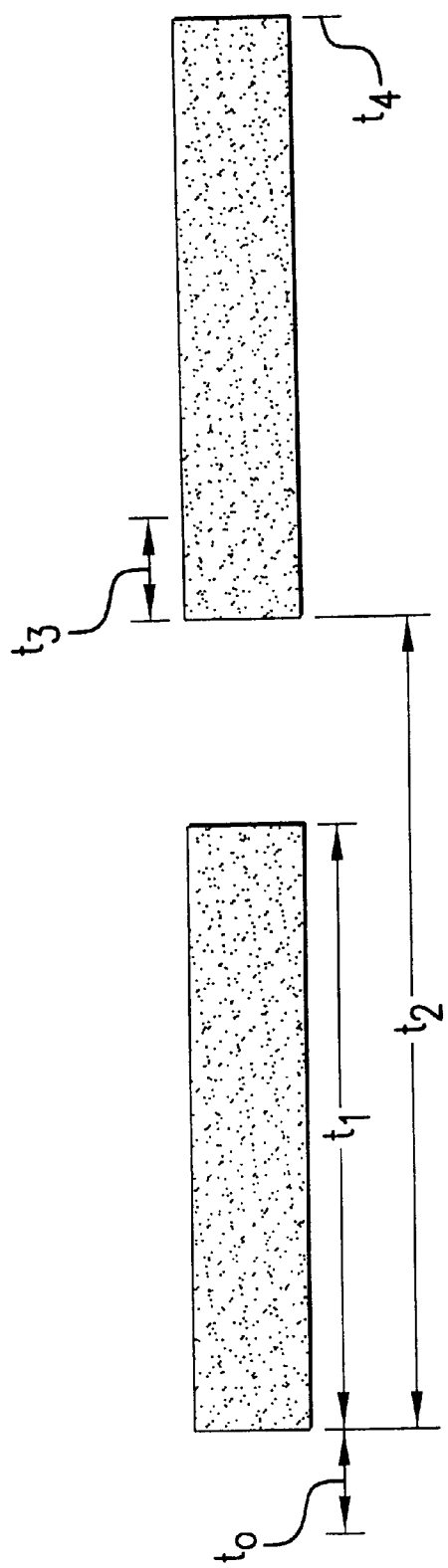
FIG. 2 is timing diagram showing events (RF transmission) vs. time for a data transmission sequence in the system of FIG.1.

According to an important feature of one embodiment of the invention, an RF packet communications protocol is provided between the remote units and the base stations, and includes a transmit/receive exchange, referred to hereinafter simply as an "exchange". This protocol is similar to collision-sense multiple access (CSMA) in that a unit first listens before transmitting, and does not transmit if the channel is not free. As seen in FIG. 2, this exchange always begins with a remote-to-base transmitted packet, representing an RF transmission from a remote unit to be received by the base stations within range. The transmitted packet is followed after a fixed time interval by a base-to-remote unit of RF information transmitted by the base station servicing this particular remote unit. Each of these packets is of fixed timing; a transceiver in a remote unit begins an exchange at its own initiative by first listening for other traffic for a brief interval to (typically 0.3 msec.) and, if the RF channel is quiet, starting a transmission at a time of its own selection (asynchronous to any clock period of the base stations or host computer). This outgoing transmission packet lasts for a time $t_1$ as seen in the Figure, and in an example embodiment this period is 4.8 milliseconds. Then at a precise time delay $t_2$ after it started transmission (e.g. 5 msec after the beginning of $t_1$) the transceiver begins listening for the return packet from the base station. The transceiver in the remote unit only responds to receipt of the packet beginning in a very rigid time window $t_3$ of a few microseconds length, and if the packet has not started during this window then anything to follow is ignored. The packet is an acknowledge signal, and also contains data if the base station has any message waiting to be sent.

The steps carried out by a mobile unit 15 which is not currently associated to an access point in selecting an access point are shown in highly simplified form in FIG. 3. In FIG. 3, the mobile unit (MU) (first noted at step 6) sends out a probe packet to all access points (APs), typically at the lowest data rate it is otherwise able to use with the network. The probe packet contains the mobile unit source address but has no destination address and hence any access point that detects the probe packet and is capable of responding at the same data rate must send a response. Accordingly, the probe packet is detected by all access points within range (step 7) and a subset of those access points sends out a probe response packet (step 8.) An evaluation of the signal quality and possibly other factors is made (as will be subsequently described) by the MU of the communications with the most eligible access point (if any) at the highest data rate. If such communications are acceptable, the MU will associate with the selected AP (step 9).

If the MU is already associated with an access point and operating at a data rate lower than the highest data rate, then depending upon the performance statistics (to be described below), it will carry out an update probe at predetermined intervals to see if it can operate at a higher data rate, with a new AP. Such roaming to a new AP is typically encountered when the MU is moved in and out of range, e.g. to and from the periphery of the network of APs.

If the MU is already associated with an access point and operating at a data rate higher than the lowest data rate but experiencing poor performance, it will carry out an update probe at predetermined intervals to see if it can roam to another AP at the same or higher data rate. Such roaming to a new AP is typically encountered when the MU is moved in and out of range, e.g. to and from the periphery of the networks of APs.

The form of the probe response packet is shown in FIG. 4. The information contained therein includes the access point address, the hopping pattern, the present channel, time left in the present channel, and in other embodiments of the invention, optionally the loading factor (discussed in more detail below) and any other timing information that may be required. Returning to FIG. 3, the mobile unit considers the subset of available access points with which to associate based an evaluation of the signal quality of the response packets that it receives.

Figure 5:
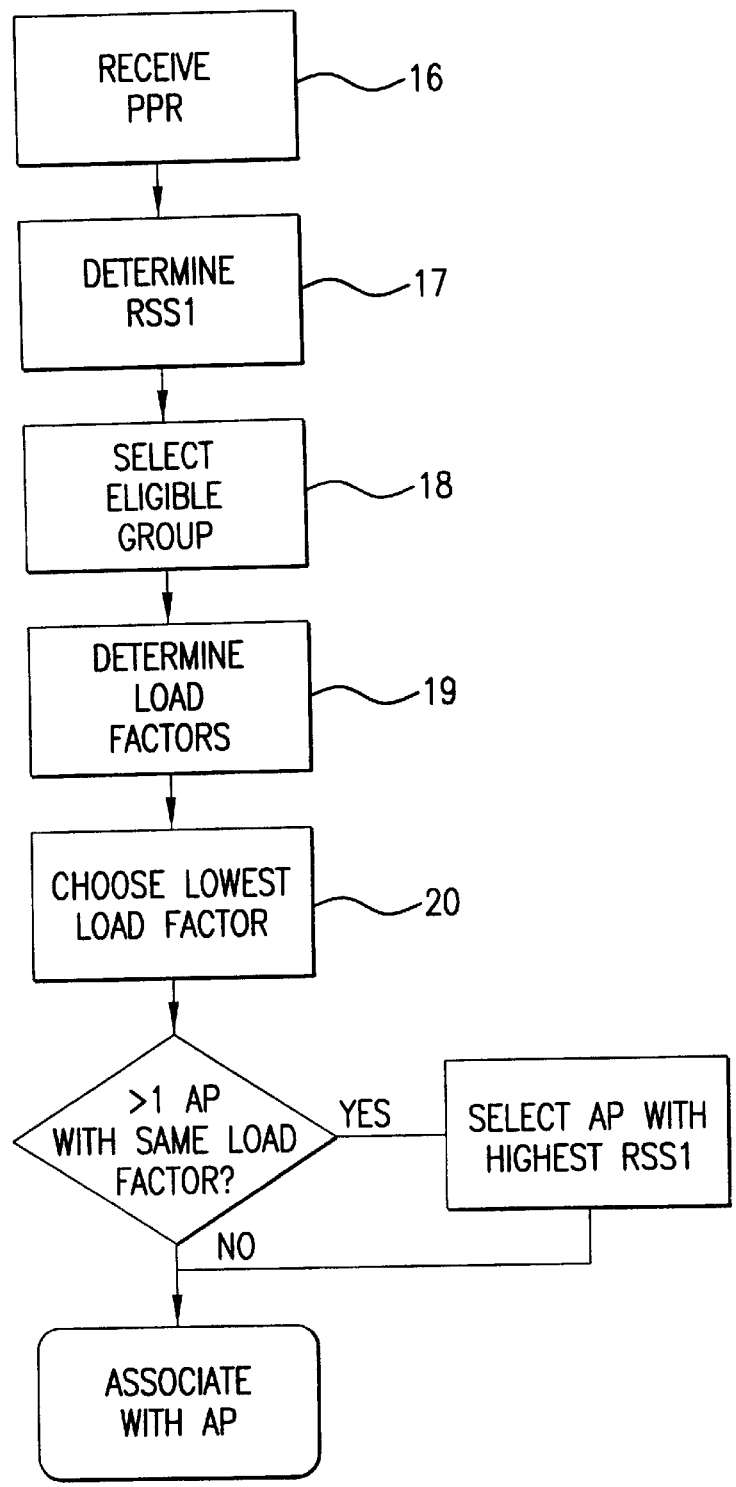
FIG. 5 is a flow chart illustrating the steps carried out by a mobile unit for selection of the most eligible access point.

Referring next to FIG. 5, at each data rate the mobile unit evaluates and considers the most eligible access point in the following manner:

As each probe packet response (PPR) is received 16 the signal quality of the response is measured by determining the received signal strength indication (RSSI) 17. For reference, RSSI values generally vary from 25 to 60, with good communications experienced above approximately 35. In practice, rather than relying on a single instantaneous value, the RSSI information for each access point along with other performance statistics is placed in a table in the memory of the mobile unit and is updated each time a probe response packet is received from that access point. In order to minimize fluctuation the RSSI value for each access point in the table is averaged over a predetermined number of responses. It has been found that large variations in the RSSI values for a given access point have been recorded even when measured by a stationary mobile unit, and averaging is used in order to reduce the range of values and minimize "slow thrashing". When "thrashing", a mobile unit associates with a first access point, then roams to a second access point after a short period of time and then further access points in a random manner without any long attachment to a single access point; the expression "slow thrashing" may be interpreted accordingly. The averaging calculation may include the step of discarding values outside a given range, for example ten or more counts below the average RSSI value.

Once the RSSI values have been calculated, an "eligible group" of access points is selected 18, including all access points having an RSSI value no more than six counts below the best detected RSSI value. From that group the access point having the lowest load factor (LF) is determined 19, 20. The load factor is a measure of how many mobile units are currently associated with a given access point; in the present case the load factor is represented by a simple numerical value representing the exact number of associated mobile units. The access point thus selected is the most eligible access point and the mobile unit then selects that access point for association. If more than one access points within the eligible group exhibit the same load factor then, of those, the access point having the highest RSSI value is selected as the most eligible access point and the mobile unit associates with that access point.

The mobile units are programmed to carry out an update probe at predetermined intervals. In the present embodiment each mobile unit carries out a full scan, probing all seventy nine channels, upon power up and every thirty seconds. The probe response packet transmitted by an access point contains all necessary synchronization information for a mobile unit to latch on to the current channel of the access point and follow the hopping pattern at any stage. In an alternative arrangement the RSSI value for the access point is calculated not from the strength of the probe response signal but from the strength of the "beacon packet" issued by the access point. Each access point issues a beacon packet every 100 milliseconds containing, in addition to other information, timing information similar to that contained in the probe response packet. A lightly different approach is taken where a mobile unit is currently associated with an access point but at a communication level that is unsatisfactory. An unsatisfactory communication level may be identified, for example, when more than fifty percent retries, cyclic redundancy code (CRC) errors or missed beacons are detected. In that case the mobile unit will re-associate using the steps illustrated in FIGS. 3 and 5 except that the access point with which the mobile unit was experiencing poor communications will be excluded from the eligible group of access points (see step 18 of FIG. 5). The ineligible access point can, however, in due course be re-admitted to the eligible group after a succession of acceptable RSSI values have been observed. It should be noted that a mobile unit experiencing poor communication will re-associate only if an eligible access point is identified.

In one embodiment, in cases where a mobile unit is not experiencing an unsatisfactory communications level (as defined above) it makes a roaming decision at predetermined times. Once again the steps described above with reference to FIG. 6 are carried out, but with the following modifications:

1. The current access point is included in the eligible group if its RSSI value is no more than eleven counts below the best RSSI value.
2. When choosing the access point having the lowest loading factor in the group, access points having a loading factor which is more than 75% of the loading factor of the current access point loading factor are excluded.

The additional steps enable the mobile unit to avoid "frivolous roaming" that is to say, re-association with new access points when the current access point is in fact satisfactory.

The system thus allows preemptive roaming providing for dynamic load balancing, that is a mobile unit may re-associate with a new access point although it is not experiencing poor communications with a current access point, but the newer access point will offer considerably improved communications. The possibility of a mobile unit losing contact with an access point altogether and experiencing periods where it is not communicating with any access points, may thus be avoided.

In addition, the system has been improved by adjusting the sensitivity so that a mobile unit will not tend to roam from a current associated access point to another at the rate that it would otherwise, where the signal strengths of various access points are similar in magnitude. Accordingly, greater stability is achieved.

In a further modification the probe packet may include an identification of the access point that the mobile unit is currently associated with for example, the BSS ID. Such an arrangement would be more reliable than the messages passed between access points relaying re-associated events.

Throughput Maximization

The overall goal of the dynamic rate control algorithm is to maximize throughput for each Mobile Unit (MU) operating within a wireless network containing multiple Access Points APs). Two transmission rates are currently within the IEEE 802.1 1 Standard-1 and 2 MBits/seconds and we will use such two rates as examples in the discussion that follows. In full generality, however, the present invention is also applicable to systems with more than two rates. We assume that each MU is capable of more than one rate, but will have a "currently selected" transmission rate. Performance statistics are maintained by the MU while operating at a given rate; for example, percentage of transmission retries (i.e. no Acknowledge frame received following a transmission). When the performance statistics reach or exceed certain thresholds, a state change will occur in the MU in an attempt to maximize throughput (KBytes/second of transferred data). The present invention attempts to maximize throughput in the following ways.

A. If at 2 MBits/second and the performance statistics indicate "poor quality", the MU will attempt to roam from one AP to another in order to maintain the 2 MBit/second performance. This roaming procedure is like that described below where RSSI and load leveling factors are considered in selecting the "best" AP. However, in addition, only APs which can support the 2 MBits /second rate are eligible.

B. If at 2 MBits/second and the performance statistics indicate "poor quality" and the MU was unable to roam to an AP which supports the 2 MBit rate, reduce the "currently selected" rate from 2 to 1 MBit/second and remain associated with the current AP. As described below, I MBit/second transmissions have a greater range (distance between an MU and an AP) than 2 MBit transmissions. The assumption is that the poor quality is due to range and that by dropping to 1 MBit the retry rate will decrease and the overall throughput will increase.

C. If at 1 MBits/second and the performance statistics indicate "good quality" and the MU has been at the 1 MBit/second rate for a period sufficient to eliminate extremely rapid rate changes (thrashing), increase the "currently selected" rate from 1 to 2 MBit/second. (Note that it is possible that the MU's position relative to the AP will once again result in poor 2 MBit performance. If so the MU may subsequently be forced to fall back to 1 MBit again, i.e. slow thrashing. However, if the MU is truly mobile, this condition will eventually change.)

Transmission Range and Transmission Rate

As noted above, MUs operating at 1 MBit transmissions have a greater range than an MU operating at a 2 MBit data transmission rate. To depict the consequence of this fact, imagine a figure depicting four Access Points and their respective ranges of coverage, both at 1 and 2 MBit transmission rates. (Note that the effective range from an AP to an MU is assumed to be the same as the range from the MU to the AP.) Place the APs at the corners of a 4 inch square. Draw a circle around each AP with a three inch radius. This is the range of "good performance" at 2 MBits. Note that the circles overlap, indicating that an MU could travel about this four AP area and maintain good 2 MBit performance. Now draw a second circle around each Access Point with a radius of 5 inches. This is the maximum range at the 1 MBit rate. Obviously, users who want continual 2 MBit performance will have to install Access Points and position them closer to one another to obtain the continuous 2 MBit coverage. It is the feature of the roaming algorithm of the present invention to roam to an AP in order to maintain 2 MBit coverage, when possible, rather than reduce the transmission rate in order to increase range. In addition, the combined roaming/dynamic rate control algorithm also has the provisions for increasing and decreasing transmission rates when roaming to maintain 2 MBit performance is not possible.

Poor 2 MBit Performance

According to the criteria in the preferred embodiment of the present invention, poor 2 MBit performance occurs when, while transmitting at 2 MBits, either of the following two conditions occurs:

A) The 2 MBit transmission retry rate is greater than or equal to 35% and there has been a statistically-significant number of transmission attempts (e.g. thirty) within a 10 second evaluation period.

B) Eight consecutive unsuccessful 2 MBit transmission attempts. (This criteria addresses the low traffic case.)

Of course, other similar or equivalent criteria can be used, or such criteria varied depending upon application or other performance considerations, and are within the scope of the present invention.

As noted above, when poor 2 MBit performance is encountered, an MU will first attempt to roam to an AP which will support continued 2 MBit performance and, if unsuccessful, will reduce its "currently selected" transmission rate to 1 MBit.

1. The first two transmission attempts for a given data frame will be tried at 2 MBits (when 2 MBits is the currently selected rate for data frame transmission). Tries 2 through N are tried at 1 MBit. This allow frames to "get through" until criteria A or B above is satisfied This temporary reduction of rate does not change the "currently selected" rate of 2 MBit.

2. MUs periodically scan for Access Points by sending Probe frames and waiting for one or more Probe Response frames from APs which happen to be on the given frequency being probed. The Probe frames are normally sent at a 1 MBit rate; Probes will be sent at 2 MBits if an MU is configured to transmit only at 2 MBits. But the dynamic rate control algorithm is only used when an MU has the option of both transmission rates. The Probe Response frame contains a data structure which specifies the rates that the AP can support, as specified in the 802,11 Specification. This information is saved for each responding AP in an Access Point Table data structure and is subsequently available to the roam algorithm for decision making.

3. When roaming away from an AP due to poor 2 MBit quality, the AP's current averaged RSSI is saved away in its corresponding Access Point Table entry. The AP will be ineligible to roam back to, when the reason for roaming is to maintain 2 MBit performance, until its averaged RSSI has increased by 3 RSSI counts. (An ongoing average RSSI is maintain for all APs which send Probe Responses to a given MU during its periodic scan/probing function.) This prevents frivolous roaming back to an AP with known poor performance at a given signal strength level. This is analogous to the 1 MBit poor quality RSSI threshold maintained for APs and described in the earlier patent applications. The expanded roaming algorithm maintains two poor quality RSSI values for an AP, one inhibiting roaming to the AP for 2 MBit performance and one inhibiting roaming to the AP even when 1 MBit performance would be acceptable.

Changing from 1 to 2 MBit/second

An MU will change its "currently selected" rate from 1 to 2 MBits/second whenever one of the following criteria is met:

A) The 1 MBit transmission retry rate is less than 7% and there has been a statistically-significant number of transmission samples (e.g. thirty) within a 10 second evaluation period.

B) The 1 MBit transmission retry rate is less than 7% and the 1-MBit rate has been in effect for at least 30 seconds. (Addresses the low traffic situation.)

C) The cell has heavy traffic (500 frame detects within 10 seconds) and the 1 MBit rate has been in effect for at least 30 seconds. (Addresses the case where the 2 MBit retry rate is due to transmission collisions rather than range.)

Power Saving Features

The mobile units may incorporate a number of power-saving features, aimed at maximizing battery life. These features, known as "power-saving protocols" (PSP), will now be described in more detail, and are independent of the data rate control functionality.

Figure 6:
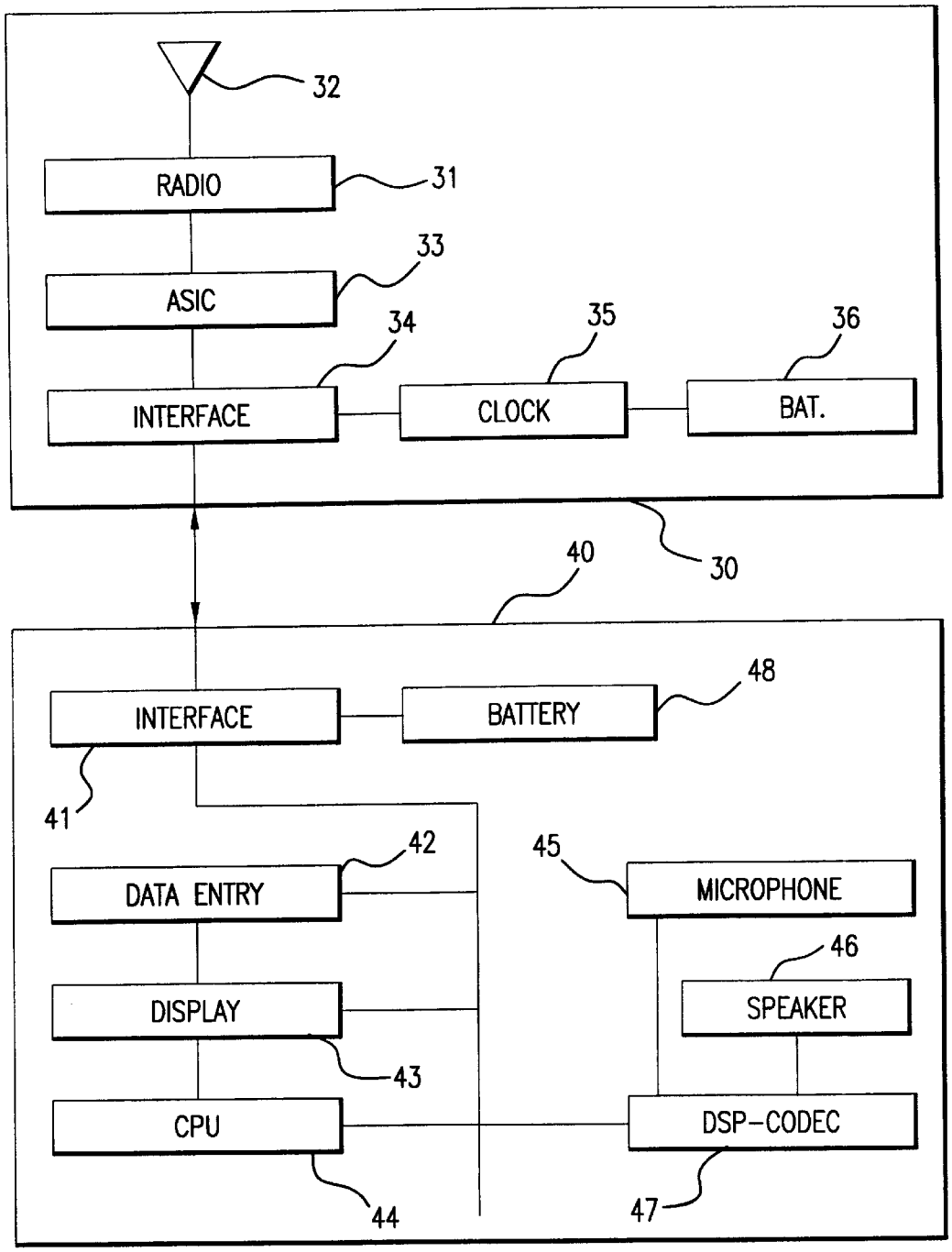
FIG. 6 shows, schematically, the functional elements that make up the mobile units shown in FIG. 1.
Figure 7:
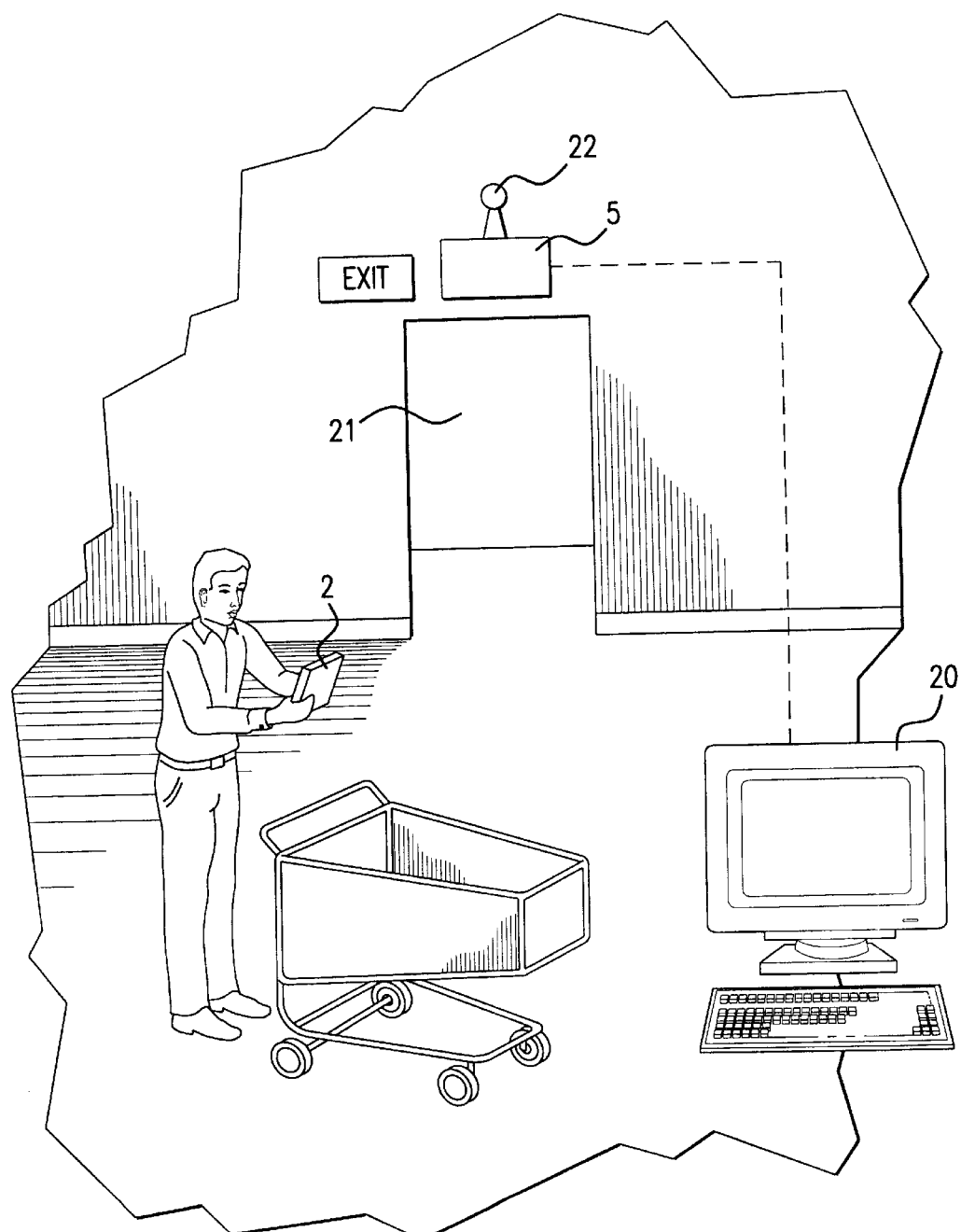

The PSP can be described with reference to an expanded block diagram of a mobile unit as shown in FIG. 6. FIG. 6 illustrates two sections of the MU, a radio section 30 and a terminal section 40.

The radio section 30 includes a transmitter/receiver radio 31 connected to an antennae 32. The radio is also connected to a circuit represented generically as ASIC 33, which may be a single IC or several, including a microprocessor, memory for storing firmware programs, static RAM, and/or application specific integrated circuits for performing a number of media level access (MAC) protocol functions and the MAC/PHY protocol interface.

In particular, the ASIC 33 will perform the function of recognizing the data rate of the incoming broadcast signals received by the radio 31, and processing such signals at the appropriate data rate. More specifically, in the context of the 802,11 Standard, this would include parsing of the packet header for the bit rate field.

The ASIC 33 also functions to implement the data rate algorithm described above and in FIGS. 4 and 5.

The terminal section 40 includes an interface 41 to the radio section 30, and a battery 48 which powers both the terminal section 40 and the radio section 30. The terminal section 40 typically includes a data entry keypad, touch screen, or keyboard 42, a display 43, CPU (including stored program memory) 44, and optionally a microphone 45, speaker 46, and CODEC/DSP circuitry 47 for voice processing to allow the mobile unit 15 terminal to provide voice communication capability.

The PSP makes use of a number of different algorithms, all of which are based on the approach of turning off the radio and CPU, both of which consume a considerable amount of power, and halting the ASIC clock in the radio section 30 while waiting for the next message from the access point. It will be recalled that the basic message control system is defined in IEEE 802.11 protocol specification, and involves the use of beacon messages with traffic indicator maps and a poll message to request transmission of the data.

The various PSP algorithms are defined in such a way as to allow a user-definable tradeoff between performance and the level of power saving.

The first algorithm is a static algorithm that wakes up the radio 31 just in time to receive every broadcast beacon. Even though the ASIC clock in the radio section has been powered down, the system still maintains a record of the time using the CMOS clock 35, which is powered by its own miniature battery 36. A similar second algorithm wakes up the radio 31 in time to receive every other beacon. Similarly, algorithms 3 to 10 switch on the radio in time to receive, respectively, every third to every tenth beacon.

Another algorithm known as "algorithm number 11" is dynamic, and permits the wakeup signals to be based on the actual message traffic. Whenever the radio 31 sends a message, or whenever it receives a message, it sets the wakeup interval to a minimum value (usually to wake up in time to receive each expected beacon.) This provides for a fast response as long as the traffic is continuous, or almost so. If no activity is detected, the algorithm provides for the wakeup interval to be gradually reduced, typically linearly, up to a maximum value of 10; in other words, at that point the radio is woken up just in time to receive every tenth beacon. Alternatively, instead of the delay increasing linearly (intervals of 1,2,3 . . . ), the algorithm may remain on maximum for a predefined period, with the delay increasing to a maximum value only once that period has been reached.

Yet a further algorithm, known as algorithm number 12, provides for even higher performance. In this algorithm, a record is kept of message traffic (based for example on the number of payload bytes of on the number of messages), and when a threshold is exceeded the radio is then switched into continuous mode. As long as significant traffic is being processed. Either outgoing or incoming, the radio will stay in continuous mode. However, if the traffic falls below the predefined threshold for a certain number of second (for example, five seconds) the system then reverts back to algorithm number 11.

For all of the algorithms previous mentioned, the time of the next beacon is of course precisely known, and may be computed so that the radio can be turned on just in time to receive the beacon. If the beacon is displayed in the access point 5 (due for example to pre-existing traffic), then the radio 31 will stay awake for some predefined period of time to ensure that the beacon is received.

Preferably, all mobile units respect the expected time of the beacon and do not transmit messages that might cause the timing of the beacon to be delayed.

If a mobile unit misses a beacon (either because it is not heard, or because it is received with an error), then the unit automatically schedules a wakeup for the next beacon, even if it would not normally expect to wake-up for that particular beacon based on the current algorithm in use. This permits fast recovery from message errors, and also helps to detect that the access point 5 is or is not transmitting beacons in a minimum amount of time.

The mobile unit is capable of going into a number of operating states or modes for managing the status of the radio 31 and the interface to the terminal. To minimize power, the radio 31 is turned on only if radio activity is required, even though the radio station 30 itself may need to be powered up to allow communications with the terminal section 40. If the radio section 30 powers up to communicate with the terminal section, and it becomes time to receive or to transmit a message, then the radio 31 is automatically powered up. Whenever the radio is no longer needed, but the interface 34 remains active, the radio may be powered down in order to save power. When the radio section 30 has no requirement to communicate either via the interface 34 of via the antennae 32, all elements of the radio are powered down, as is the ASIC 33. The system then awaits a wakeup call either from the beacon timer associated with the clock 35 or from the terminal section 40 (for example, because the user has activated the data entry 42).

If the mobile unit is unassociated with an access point, it may remain in power save mode. In that mode, it automatically wakes up to search for an access point periodically (for example every second), thereby minimizing use of power but still providing a reasonable capability of finding an access point with which the unit can associate fairly rapidly. Once the mobile unit has associated with an access point, it needs to wake up only in order to receive beacon messages.

The mobile unit preferable provides close coupling between the radio section 30 and the terminal section 40, in order to provide appropriate network support with minimum power usage. The units typically have an active mode (either full power or power-save mode), a suspend mode (all unnecessary items are off but the CPU can resume at any time), and a power-off mode (minimum power, with no internal activity except for the CMOS clock 35, but still able to resume from where it left off before the power was cut.)

The radio section 30 is tightly integrated with the terminal section 40 in several ways, thereby permitting joint power saving modes. Firstly, the radio section may be set to remain in its prescribed operating mode whenever the terminal section 40 is active. Second, when the terminal section 40 goes into suspend mode, the radio section 30 is placed in a low power mode automatically. This may for example be the PSP algorithm number 10, described above. In this mode, the radio section is capable of receiving messages directed to the terminal section 40. Options exist to allow either directed packets only, or directed and broadcast/multicast packets. These options allow the customization of the network to minimize the power by minimizing wakeup events. When a qualified packet is received, the radio section 30 places the data in a buffer within RAM (not shown) and wakes up the terminal section 40. As the terminal section may require some time to wake up, radio section 30 may buffer received packets until such time as the terminal section 40 is able to process them.

While in the suspend mode, the radio section 30 has the option of powering itself down if no activity has been detected for a programmable amount of time, for example 1 hour. This allows a mobile unit that has been left inactive, or has gone out of range, to limit battery consumption to a reasonable amount.

If the terminal has been turned "off" (left in a powered but fully inactive state), the radio section 30 is automatically put to sleep, the lowest level of power consumption. In this mode, it does not respond to messages or to wakeup commands. When the terminal section 40 is then powered up ("Resume"), the radio section 30 itself the automatically powers up and resumes form its present state.

If the terminal section 40 loses power (for example, if the battery 48 is removed), the radio section 30 is automatically switched off or otherwise powered down. In that mode, the battery 36 may act as a backup battery, able to sustain the operating state of the terminal section. Alternatively, a separate backup battery (not shown) may be provided. When the battery 48 is reinserted or an alternative power source becomes available, the terminal section 40 is able to resume with no loss of data, automatically powering itself up and reconfiguring the radio section 30 with no intervention required by the operator. After the radio section 40 has been reconfigured, it scans in the normal way for access points and re-establishes association with the network.

The terminal section 40 and the radio section 30 may also be provided with further functionality to prevent a lockup state occurring between the two sections during a suspend or power-down operation. Here the terminal section 40 interrupts the radio section 30 and commands that no wakeup operations be generated for a minimum interval (for example 1 second). During that interval, the terminal section 40 can then safely suspend or power-down. After that interval has elapsed, the radio section 30 is free to wakeup the terminal section 40 when a message is received.

The terminal section 40 and the radio section 30 may coordinate communications using a command register and an 30 interrupt. In one embodiment, the radio section 30 may include a programmable wakeup timer. The radio section 30 may then be woken up either by that timer, or by a message communicated over the airwaves and received by the radio 31, of by a command received from the terminal section 40 via the interface 34.

In order to synchronize the interface 34 the terminal section may generate one of three commands, with the radio section responding with a ready flag. The three commands are Awake for Host, Resume, and Sleep. These cause the radio section 30 to execute different actions, as described below.

In response to the Awake for Host command, the radio section 30 sets the ready flag. This allows the terminal section 40 to communicate directly with the radio section 30, to receive messages, to send messages and to process commands. In response to the Resume command, the radio section 30 turns off the ready flag to indicate that it is in an uncoordinated state, and the radio section 30 can power down whenever it decides that it has finished with communications both with the radio 31 and with the terminal section 40. In this mode, the radio section 30 will wakeup whenever a signal is received from the wakeup timer associated with the clock 35.

In response to the Sleep command, the radio section 30 stops whatever operations it may have been carrying out, in the minimum amount of time, and then goes to a low power suspend mode. When the radio section 30 receives a Resume message, it then reverts back to normal PSP mode.

It will be understood that each of the features described above, or two or more together, may find a useful application in other types of wireless local area network and data communications system differing from the types described above.

While the invention has been illustrated and described as embodied in it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A method in a data communications network including a plurality of stationary access points and a plurality of mobile units, the mobile unit being capable of transmitting at least two data rates and capable of communicating with at least two access points in a predetermined range therefrom, comprising the steps of:

evaluating the mobile unit performance; and scanning for the most eligible access point at periodic predetermined intervals wherein the most eligible one of the access points is selected according to received signal quality at said one of the mobile units, and a loading factor at each of the access points, and in which an eligible group of said access points is selected from all the access points having a signal quality above a predetermined threshold; the group including a current one of the access points having a signal quality above a further predetermined threshold; and the most eligible access point being selected from all the access points having the lowest loading factor; wherein the access point of more than a given proportion of the loading factor of the current one of the stationary access points are excluded; and wherein, when a plurality of the access points has the same loading factor, the access point having the highest signal quality is selected as the most eligible access point;

associating with the most eligible access point at the highest data rate.

2. The method as defined in claim 1, further comprising the step of transmitting a data packet from a mobile unit to an access point at a selected frequency which is one of a predetermined sequence of frequencies in a band, said selected frequency being changed at regular intervals within a repeat period.

3. The method as defined in claim 2, wherein the access point transmits at predetermined intervals a beacon data packet that includes a control frame such packet being transmitted at a data rate that can be understood by all mobile units on the network.

4. The method as defined in claim 2, further comprising the step of receiving said data packet at said access point at said selected frequency and synchronizing said access point in response to the data rate of the mobile unit.

5. The method as defined in claim 1, wherein the step of evaluating the mobile unit performance measures a percent of transmission.

6. The method as defined in claim 1, wherein the step of associating with the most eligible access point is performed by selecting the access point and data rate that maximizes data throughput.

7. A data communications network including a plurality of stationary access points and a plurality of mobile units, the mobile unit being capable of transmitting at least two data rates, and capable of communicating with at least two access points at a predetermined range therefrom, comprising:

means in the mobile unit to scan for the most eligible access point at periodic predetermined intervals, wherein the most eligible one of the access points is selected according to received signal quality at said one of the mobile units, and a loading factor at each of the access points, and in which an eligible group of said access points is selected from all the access points having a signal quality above a predetermined threshold; the group including a current one of the access points having a signal quality above a further predetermined threshold; and the most eligible access point being selected from all the access points having the lowest loading factor; wherein the access point of more than a given proportion of the loading factor of the current one of the stationary access points are excluded; and wherein, when a plurality of the access points has the same loading factor, the access point having the highest signal quality is selected as the most eligible access point;

means in the mobile unit for evaluating performance statistics and received access point signal quality;

means in the mobile unit to change the data rate to a second data rate; and means for associating with the most eligible access point at the highest data rate.

8. The network as defined in claim 7, wherein each mobile unit includes a transmitter for broadcasting a probe packet to all of the access points in a predetermined range from the mobile unit that is broadcasting the probe packet, said access points within said range including respective receivers for detecting the probe packet being broadcast, and for responsively sending probe response packets back to said one of the mobile units, and a selector in each of the mobile units to select a most eligible one of the access points from said probe response packets, and to associate said one of the mobile units with the most eligible one of the access points at predetermined intervals.

9. The network as claimed in claim 7, in which said one of the mobile units identifies all said stationary access points with a signal quality at least equal to a threshold value, and selects for association the most eligible one of the access points having the lowest loading factor, and in which, when a plurality of said stationary access points has an equal lowest loading factor, the stationary access point having the highest received signal quality is selected.

10. The network as claimed in claim 9 in which a threshold value is set below the highest received signal quality.

11. The network as claimed in claim 10, in which one of said plurality of the mobile units, associated with one of said stationary access points and experiencing an unacceptably low signal quality, roams and excludes said one of the stationary access points from selection.

12. The network as claimed in claim 10 wherein an unacceptably low signal quality is achieved when more than 50% retries, CRC errors or missed beacons are experienced.

13. The network as claimed in claim 10 in which the excluded one of the stationary access points is re-included for selection when the received signal quality exceeds a predetermined limit.

14. The network as claimed in claim 10 in which, if none of the stationary access points is identified for re-association, said one of the mobile units continues to associate with a current one of the stationary access points.

15. The network as claimed in claim 10 in which each of the mobile units, associated with a current one of the stationary access points and achieving a satisfactory level of communication, makes a selection decision at selected intervals.

* * * * *